Patented Aug. 21, 1945

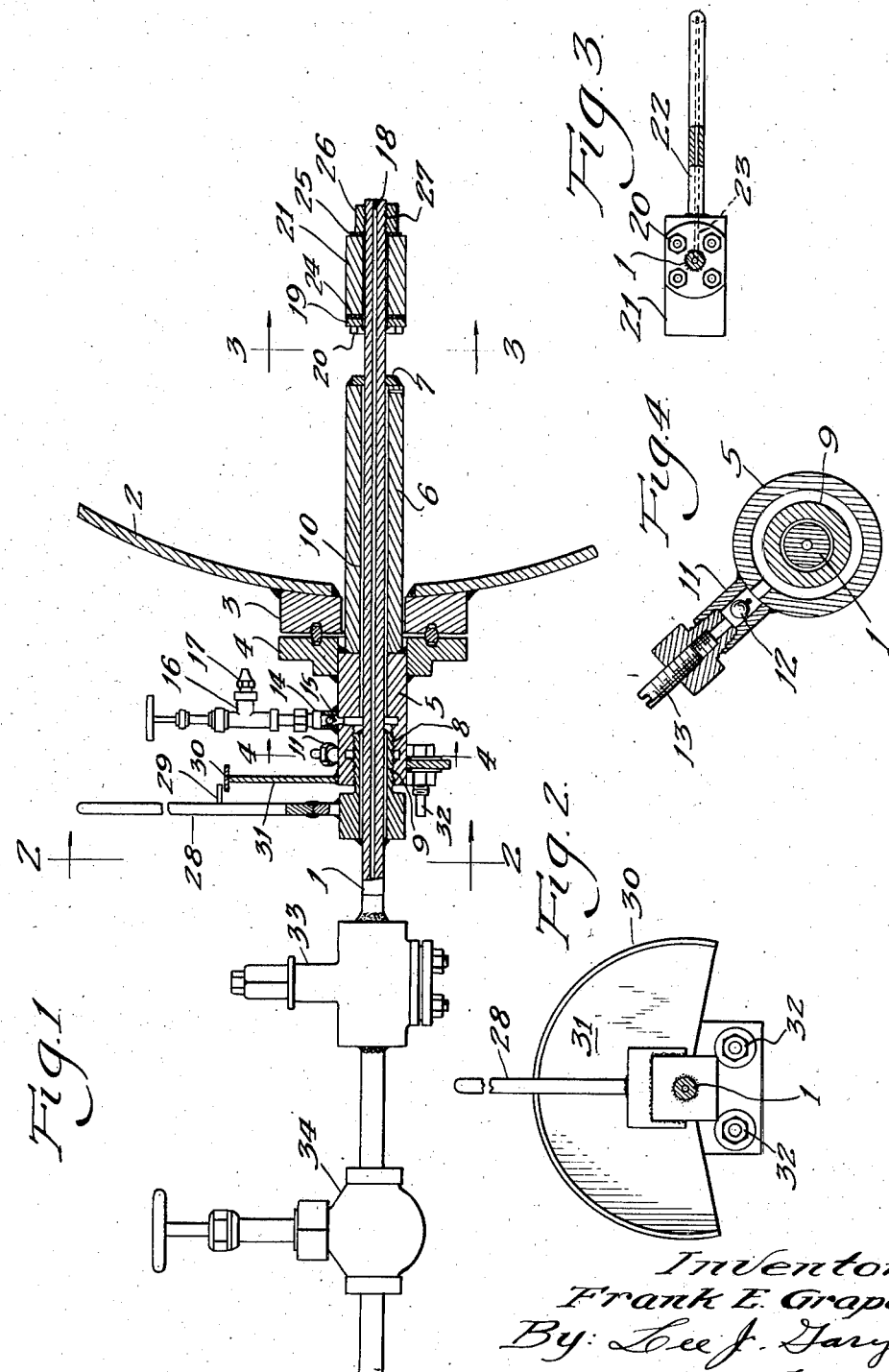

2,383,187

UNITED STATES PATENT OFFICE 2,383,187

LIQUID LEVEL INDICATOR

Frank E. Grapes, Chicago, Ill., assignor to Universal Oil Products Company, Chicago, Ill., a corporation of Delaware Application February 28, 1944, Serial No. 524,169

4 Claims. (Cl. 73—298)

This invention relates to an improved form of apparatus for indicating liquid levels of interfaces in closed vessels.

More specifically, this invention is concerned with a means for indicating levels and interfaces in vessels handling corrosive fluids, such as mixtures of hydrofluoric acids and hydrocarbons which present a potential danger to the safety of operating personnel.

Because of the nature of hydrofluoric acid no entirely reliable means which is convenient, accurate and safe has heretofore been proposed for indicating the liquid level and interface levels in vessels handling this material. It is absolutely necessary in the operation of plants handling these materials, for example, in plants wherein the alkylation of hydrocarbons is accomplished with hydrogen fluoride catalyst, that some means be provided for indicating accurately in the various vessels the quantity of acid contained therein.

The present invention offers a reliable means for indicating liquid levels which offers a minimum hazard to operating personnel and is economical in construction and maintenance. The apparatus has the advantage that the greatest accuracy and sensitivity occurs in the direction of the uppermost and lowermost level ranges of the vessel under exploration.

In order to more clearly point out the advantages and features of this invention reference is made to the accompanying diagrammatic drawing and the following description thereof.

Figure 1 of the drawing is an elevational view shown principally in section of a preferred form of the apparatus which is the object of the invention.

Figure 2 is a view as taken from a plane indicated by line 2—2 in Figure 1 and illustrates the operating lever and graduated scale for indicating the position of the liquid level in the vessel.

Figure 3 is a view taken from the plane as indicated by line 3—3 in Figure 1. This figure illustrates the extended open ended conduit or probe for exploring the interior of the vessel.

Figure 4 is a sectional view taken from the plane as indicated by line 4—4 in Figure 1 and illustrates one of the packing grease introducing means for the apparatus.

Referring now to the drawing, numeral 1 denotes a substantially horizontally disposed rotatable conduit which projects through a nozzle provided in an opening in wall 2 of the vessel, said nozzle comprising the elements 3 to 7 now to be described. The vessel wall is provided with a pad-type flanged member 3 to which complementary flange 4 is secured by bolts not shown. Ring type joint facings are shown for member 3 and flange 4 but it is well within the scope of the invention to use other types of facing if they are adequate for the service. To flange 4 is secured by welding or other suitable means projecting portion 5 through which is bored a port for receiving conduit 1. Extending inwardly from flange 4 and member 5 and secured thereto by welding is another projecting portion 6 which is provided at its inner end with a bearing portion 7 for journaling the rotatable conduit 1.

Adjacent its outer end projecting portion 5 is provided with internal threads 8 which are adapted to receive threaded portion 9 which is secured by welding to conduit 1. It is preferable that these threaded portions be accurately machined so that they closely engage each other and retain the sealing grease in its desired position within the apparatus. Between port 10 provided through members 5 and 6 and conduit 1 it is preferable that some clearance be provided so that a considerable portion of sealing grease will at all times be positioned in the apparatus between the inner and outer ends of the port. It is desirable that part 10 be maintained filled with grease at all times in order to safeguard against any possible leakage of hazardous materials from the vessel to the operating area adjacent the outer end of the port.

For packing the threaded portion of the seal it is preferable that a heavy material be employed, for example, when used in connection with vessels containing hydrofluoric acid a suitable packing is Merco-Nordstrom #914 stem packing. This packing may be introduced through connection 11 which communicates with the threaded portion of the seal. This inlet connection is provided with ball check 12 and a removable screw 13 by means of which pressure may be exerted on the packing grease to force it throughout the sealed zone. This screw also serves as a permanent plug. For packing port 10 a less viscous grease may be used, such as Merco-Nordstrom lubricant #788-S. This lubricant is introduced through connection 14 which is also provided with a ball check 15 and a shutoff valve 16. The grease may be introduced by means of a grease gun through a suitable connector 17. Valve 16 is provided primarily to positively isolate the system from the greaser when connecting and disconnecting grease gun and for maintaining a more complete shutoff thereby preventing the possibility of leakage through the seal.

It is, of course, understood that the above specified greases are named for illustrative purposes only as it is well within the scope of the invention to use any other suitable packing grease or lubricants depending upon the type of service to which they are to be subjected.

The inner end of conduit 1 is sealed by plug weld 18 or other suitable means and is provided at a spaced distance from this end with a flange-like member 19 which is secured thereto by welding or other suitable means. Fastened to member 19 by means of bolts 20 is a member 21 to which is secured an extended conduit 22. Bolts 20 prevent member 21 from twisting out of position. Conduit 22 is open at its extreme end and communicates at its other end through port 23 in member 21 with conduit 1. Member 21 is made of such proportions that it counterbalances the weight of conduit 22 to eliminate torque from conduit 1 and facilitate the rotation of the probe. A suitable gasket 24 is provided between members 19 and 21 and the opposite side of member 21 is sealed by means of a suitable gasket 25 and nut 26 which engages the threaded portion 27 of conduit 1.

An operating handle 28 carrying pointer 29 is secured to conduit 1 through member 9 by welding or other suitable means. A curved graduated scale 30 which is supported by and secured to member 5 by means of web 31 is used in conjunction with pointer 29 to indicate the angular position of conduit 22 within the vessel. To prevent excessive rotation of the apparatus, limit stops 32 are provided.

Opening and closing means are provided for the outer end of the conduit comprising a plug cock 33 for tight shutoff and a needle valve 34 for throttling control.

In using the apparatus it is only necessary to rotate conduit 1 by means of handle 28 and at selected stages throughout this rotation to open valves 33 and 34 and determine the type of material which issues from the outer end of conduit 1. When the exploration is completed it is desirable that plug cock 33 be moved to a closed position to prevent the possibility of hazardous materials issuing from the open end of the conduit at some unexpected instant when the operator is unprepared.

By maintaining the seal filled with suitable grease at all times this apparatus will provide accurate indications of the liquid level or interface within a vessel containing hazardous material with a minimum of danger to operating personnel.

I claim as my invention:

1. A liquid level indicating device for use in conjunction with a vessel which comprises in combination a nozzle provided in a wall of said vessel, said nozzle being provided with a port, a substantially horizontally disposed rotatable conduit positioned in said port, said conduit projecting through said wall being closed at its end within said vessel and carrying on said end an angularly projecting conduit communicating at one end with said rotatable conduit and at the other end with the interior of said vessel, opening and closing means for the end of said rotatable conduit which is exterior to said vessel, sealing means provided in said port comprising a grease packing between the outer wall of said rotatable conduit and the wall of said port, and means indicating the angular displacement of said rotatable conduit, said port and said rotatable conduit being provided with complementary threaded portions at that end of said port which is exterior to said vessel.

2. The apparatus defined in claim 1 further characterized in that said port is co-extensive for a substantial distance with said rotatable conduit.

3. A liquid level indicating device for use in conjunction with a closed vessel which comprises in combination a nozzle provided in a wall of said vessel, said nozzle being provided with a port, a substantially horizontally disposed rotatable conduit positioned in said port, said port and conduit being co-extensive for a substantial distance, said conduit extending from within said vessel to a point exterior thereof, said conduit being closed at its end within said vessel and provided with a closing and opening means at its end exterior to said vessel, a second conduit secured to and communicating with that end of said first mentioned conduit which is within said vessel, said second conduit projecting angularly away from the axis of rotation of said first conduit and communicating at its outer end with the interior of said vessel, said port and first mentioned conduit being provided with complementary threaded portions adjacent that end of said port which is exterior to said vessel, inlet means for introducing grease packing to said threaded portions, inlet means for introducing a second grease packing to the balance of said port which is co-extensive with said first mentioned conduit, and means attached to an exterior portion of said first mentioned conduit for indicating the angular displacement of said second conduit.

4. In combination, a liquid level indicating device for a vessel, said device comprising a nozzle provided in a wall of the vessel and having a port extending therethrough, a substantially horizontal rotatable conduit disposed in said port and extending into the interior of said vessel, said conduit having adjacent the end thereof within the vessel an angularly projecting portion communicating with the interior of the vessel and with the horizontal portion of the conduit, means for retaining sealing grease in said port comprising complementary threaded portions on said conduit and nozzle exterior to the vessel, opening and closing means for the rotatable conduit exterior to the vessel, and means for indicating the angular displacement of said rotatable conduit.

FRANK E. GRAPES.